UNITED STATES PATENT OFFICE.

JEAN MARIE RAYMOND, OF PARIS, FRANCE.

PROCESS OF TREATING VULCANIZED RUBBER TO RENDER IT ADHESIVE.

SPECIFICATION forming part of Letters Patent No. 490,500, dated January 24, 1893.

Application filed October 14, 1892. Serial No. 448,895. (No specimens.) Patented in France March 30, 1892, No. 220,520.

*To all whom it may concern:*

Be it known that I, JEAN MARIE RAYMOND, a citizen of the Republic of France, residing at Paris, France, have invented a certain new and useful Improvement in Processes of Treating Vulcanized Rubber to Render it Adhesive, (said invention having been patented in France, of date March 30, 1892, No. 220,520;) and I declare the following to be full, clear, and exact description of the invention, such as will enable others skilled in the art to which it appertains to make and use the same.

My invention has for its object to provide a method or process of treating vulcanized rubber, to restore thereto the adherent qualities lost by sulphuration without taking away its extensibility or elasticity.

It is well known that the sulphuration of rubber commonly called "vulcanization" enhances the qualities of extensibility and elasticity of the product, but at the same time it takes away its adherent property.

For numerous uses as for the manufacture of divers' suits, insulating covering of telegraphic and telephonic wires, fabrication of tubes, cushions, &c., as well as whenever a rubber sheet is to be placed between two stuffs, and consequently cannot undergo a vulcanizing operation, there is great advantage in using vulcanized rubber, adherent at different degrees, be it for overcoming the destructive action of cold, or of intensive heat, or for obtaining easy and solid unions, weldings or ligatures, or for any reason whatever.

More particularly I obtain the results sought for, by proceeding in the following manner. I first open the pores of the rubber by drenching it in benzine, terebinthine essence, naphtha, or essential oil, and then in order to secure its penetration by elements of a substance capable of superficial desulphuration, and rendering its character adhesive, I afterward plunge the rubber into a solution of permanganate of potassium, at the necessary degree of temperature. So treated it will be found that the rubber has recovered its adhesive quality, which will develop itself to a desired degree by another soaking in terebinthine, benzine, naphtha, or a mixture of these products. In certain cases before this last named operation, and in order to give more tenacity to the rubber, I drench it in a bath of acetic acid or simply pyroligneous acid. In this manner I succeed in giving to vulcanized rubber the adherent qualities lost by the sulphuration, and I can, as may be desired, increase or diminish the degree of its adhesiveness by varying the time of the action of the above named materials.

Having thus described my invention, what I desire to protect by Letters Patent is:

1. The process herein described of rendering vulcanized rubber adhesive, consisting of treating the rubber with benzine or a substance having an analogous action thereupon, and by immersion thereof in a solution of permanganate of potassium, substantially as described.

2. The process herein described of treating vulcanized rubber to render it adhesive, consisting of opening the pores of the vulcanized rubber by soaking it in benzine or a substance having an analogous action thereupon, then securing its superficial desulphuration by immersion in a solution of permanganate of potassium, and then plunging the rubber into benzine or an analogous substance, substantially as described.

3. The process herein described of rendering vulcanized rubber adhesive consisting of treating said rubber with benzine or a substance having an analogous action thereupon, then immersing the rubber in a solution of permanganate of potassium and a suitable acid, and again treating the rubber with benzine or a substance having similar action thereon, substantially as described.

In testimony whereof I sign this specification in the presence of two witnesses.

JEAN MARIE RAYMOND.

Witnesses:
N. S. WRIGHT,
JOHN F. MILLER.